3,178,451
VITAMIN C COMPOSITIONS AND METHOD OF PRODUCING SAME

Zoila Reyes, Menlo Park, Calif., assignor, by mesne assignments, to R. P. Howard & Company, Los Angeles, Calif., a corporation of California
No Drawing. Filed Mar. 14, 1962, Ser. No. 179,811
2 Claims. (Cl. 260—343.7)

This invention relates to new forms of vitamin C, and in particular to new chelate complexes of L-ascorbic acid.

The new compositions are useful as a source of vitamin C in known applications and have particular application for use in which prolonged stability of vitamin C against oxidation and against dissociation in aqueous media is desirable.

The invention relates to a process for producing relatively stable forms of ascorbic acid. The new compositions may be broadly defined as chelate complexes comprising ascorbic acid, a polyvalent metal ion, and an organic moiety selected from the group consisting of an aliphatic carboxylic acid, an amino acid, and a hydroxy acid and esters thereof. Particularly useful stabilized forms of ascorbic acid in accordance with this invention are chelate complexes of ascorbic acid involving calcium, magnesium and aluminum with organic moieties selected from the group consisting of (a) aliphatic carboxylic acids, e.g., acetic, propionic, lauric, and stearic; (b) amino acids, such as glycine, glutamic, phenyl alanine, valine, leucine, and ethylene diamine tetraacetic; (c) hydroxy acids and their esters such as lactic acid, stearoyl lactic acid, citric acid, lauroyl citric acid, and alginic acid.

The general composition of these stable chelate complexes corresponds to the following:

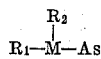

where $R_1$ is selected from groups $a$, $b$, and $c$ above

M is a metal ion such as calcium, magnesium or aluminum
As is ascorbic acid and where $R_2$ is zero where M is calcium and magnesium and is As, $R_1$, or OH where M is aluminum.

Although the formula given above indicates the complexes to be mixed salts, it is intended that the invention cover all chelate complexes of the various components including for example double salts and salt complexes prepared with excess amounts of the component $R_1$. For example it is contemplated that a complex prepared with one mole of magnesium, 1.5 moles of stearic acid, and 0.5 mole of ascorbic acid would be within the scope of the invention. All of these chelate complexes are characterized by minimum dissociation in aqueous media and by improved stability of the ascorbic acid toward degradation in the aqueous media. The stability of the complexes and their ability to stabilize ascorbic acid is destroyed by strong acids, e.g., by hydrochloric acid.

A general method for producing the novel chelate complexes of ascorbic acids comprises reacting compounds providing ascorbic acid, a polyvalent metal ion, and an organic moiety selected from the group consisting of aliphatic carboxylic acid, an amino acid, and a hydroxy acid or ester thereof such as set forth above, in organic solvent media.

Example

One of the preferred embodiments of this invention is a magnesium stearate ascorbate complex prepared as follows:

Magnesium stearate (1 mole) and ascorbic acid (1 mole) are suspended in dry benzene containing methanol. The mixture is refluxed until clear, evaporated to dryness, benzene added to redissolve the product and removed in vacuo to assure removal of water. The product is then taken up in petroleum ether and filtered. The filtrate contains magnesium stearate ascorbate with excess stearic acid. The product can be isolated as a white powder by evaporation of the petroleum ether. If desired, the excess stearic acid can be removed to give magnesium stearate ascorbate by rapid washing of the powder with anhydrous acetone.

The product may be regarded as a mixed salt or double salt of magnesium with stearic and ascorbic acids. The composition of the product will vary to some extent with the method of preparation and purification. The product washed with acetone as defined above contains about 25% of ascorbic acid. It softens in the range of 108° C. to 110° C. and is found to be remarkably stable against oxidation and dissociation even in the presence of aqueous media.

The relative stability of soluble chelates can be measured in solution, dissociation constants obtained and stability of the ascorbic acid determined in the system.

In one such determination, magnesium stearate ascorbate was dissolved in 99 percent methanol, 1 percent $H_2O$ at $7 \times 10^{-5}$ molar concentration. The stabilization of this highly dilute and highly sensitive ascorbic acid containing system was followed by ultraviolet absorption studies, which showed that as much as 25 percent of the ascorbic acid was still present after 50 hours. A blank run with unstabilized, unchelated scorbic acid in this media at this very low concentration showed that 99 percent was destroyed in 4 hours. In this system, the chelate system is soluble and is a remarkable indication of the stabilizing power of the chelate.

Calcium stearate ascorbate and aluminium stearate ascorbate may be prepared in a similar manner by utilizing calcium stearate and aluminum stearate in place of the magnesium stearate of the example. In the case of aluminum stearate one or two moles of ascorbic acid may be utilized to replace a proportionate amount of stearic acid from the aluminum stearate molecule.

Other chelate complexes within the scope of the general formula given above can be prepared by using appropriate starting materials providing the components disclosed above. It will also be understood that different starting materials providing appropriate metal ion, ascorbic acid and stearic or other fatty acid moiety can be utilized to prepare calcium, magnesium, and aluminum stearate ascorbate and similar complexes of ascorbic acid, fatty acid with the metal ion. Complexes with the saturated fatty acids of C–8 to C–18 chain length are very satisfactory although complexes involving organic moieties of the other types given above are readily prepared and successfully utilized.

I claim:

1. A chelate complex of ascorbic acid, a saturated unsubstituted fatty acid of C–8 to C–18 chain length, and a polyvalent metal ion selected from the group consisting of calcium, magnesium and aluminum.

2. Magnesium stearate ascorbate.

References Cited in the file of this patent

UNITED STATES PATENTS 2,117,777    Warnat _____ May 17, 1938

FOREIGN PATENTS 495,675    Great Britain _____ Nov. 17, 1938
1,182,874    France _____ Jan. 19, 1959

OTHER REFERENCES

Karrer: Organic Chem., Elsevier, New York, N.Y. (1938), page 182.

Merck Index, Rahway, New Jersey (1952), 6th Edition, page 903.